United States Patent
Hashimoto et al.

(10) Patent No.: US 10,538,247 B2
(45) Date of Patent: Jan. 21, 2020

(54) AUTONOMOUS DRIVING SYSTEM

(71) Applicant: Toyota Jidosha Kabushiki Kaisha, Toyota-shi, Aichi-ken (JP)

(72) Inventors: Ryuta Hashimoto, Susono (JP); Yoshinori Watanabe, Isehara (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 183 days.

(21) Appl. No.: 15/824,671

(22) Filed: Nov. 28, 2017

(65) Prior Publication Data

US 2018/0178801 A1 Jun. 28, 2018

(30) Foreign Application Priority Data

Dec. 26, 2016 (JP) .................. 2016-251326

(51) Int. Cl.
| | | |
|---|---|---|
| *B60W 30/18* | (2012.01) | |
| *G05D 1/00* | (2006.01) | |
| *B60W 30/095* | (2012.01) | |
| *B60W 30/12* | (2006.01) | |
| *B62D 15/02* | (2006.01) | |

(52) U.S. Cl.
CPC .. *B60W 30/18163* (2013.01); *B60W 30/0956* (2013.01); *B60W 30/12* (2013.01); *B62D 15/025* (2013.01); *G05D 1/0088* (2013.01); *G05D 2201/0213* (2013.01)

(58) Field of Classification Search
CPC ....... B60W 30/18163; B60W 30/0956; B60W 30/12; B62D 15/025; G05D 1/0088; G05D 2201/0213
See application file for complete search history.

(56) References Cited

U.S. PATENT DOCUMENTS

| | | | |
|---|---|---|---|
| 8,880,296 B2* | 11/2014 | Breed ................ | B60R 21/0134 180/167 |
| 9,096,267 B2 | 8/2015 | Mudalige et al. | |
| 10,431,095 B2* | 10/2019 | Jain ....................... | B60W 30/00 |
| 2015/0210274 A1* | 7/2015 | Clarke .................. | B60W 30/00 382/104 |
| 2016/0272199 A1* | 9/2016 | Kawahara ............. | B60W 30/16 |

(Continued)

FOREIGN PATENT DOCUMENTS

| | | |
|---|---|---|
| JP | 2016137819 A | 8/2016 |
| JP | 2018025976 A | 2/2018 |

*Primary Examiner* — Calvin Cheung
(74) *Attorney, Agent, or Firm* — Dinsmore & Shohl LLP

(57) ABSTRACT

An autonomous driving system mounted on a vehicle, includes: an information acquisition device configured to acquire driver operation information indicating an operation by a driver of the vehicle; and an autonomous driving control device configured to perform autonomous driving control of the vehicle. The autonomous driving control device performs: default lane setting processing that sets a default lane in which the vehicle travels; and vehicle travel control processing that controls the vehicle to travel in the default lane when there is no departure reason for departing from the default lane and to travel away from the default lane until there is no departure reason when there is the departure reason. In the default lane setting processing, the autonomous driving control device refers to the driver operation information to set the default lane according to the driver's intention.

12 Claims, 19 Drawing Sheets

(56) References Cited

U.S. PATENT DOCUMENTS

| | | | |
|---|---|---|---|
| 2017/0267177 A1* | 9/2017 | Nariyambut Murali | B60R 1/00 |
| 2017/0355368 A1* | 12/2017 | O'Dea | G05D 1/0223 |
| 2018/0037223 A1* | 2/2018 | Goto | B60W 30/12 |
| 2018/0047292 A1 | 2/2018 | Hashimoto et al. | |
| 2018/0081371 A1* | 3/2018 | Bar-Tal | G05D 1/0253 |
| 2018/0088572 A1 | 3/2018 | Uchida et al. | |
| 2018/0237019 A1* | 8/2018 | Goto | B60W 30/14 |

* cited by examiner

AUTONOMOUS DRIVING SYSTEM

CROSS-REFERENCE TO RELATED APPLICATIONS

This application claims priority to Japanese Patent Application No. 2016-251326 filed on Dec. 26, 2016 which is incorporated herein by reference in its entirety include the specification, drawings, and abstract.

BACKGROUND

Technical Field

The present disclosure relates to an autonomous driving technique for a vehicle. In particular, the present disclosure relates to lane planning that plans a lane in which the vehicle travels during autonomous driving.

Background Art

Patent Literature 1 discloses a system for controlling lane change in an autonomous driving vehicle. When trying to make a lane change, the system checks a situation of surrounding vehicles. More specifically, the system checks whether or not any surrounding vehicle close to the subject vehicle exists in a target lane of the lane change. If any surrounding vehicle exists nearby in the target lane, the system does not execute the lane change.

LIST OF RELATED ART

Patent Literature 1: U.S. Pat. No. 9,096,267

SUMMARY

An autonomous driving system performs lane planning that plans a lane in which a vehicle travels. According to the technique disclosed in the above-mentioned Patent Literature 1, a driver's intention (i.e. which lane the driver wants to travel) is not considered in the lane planning. Therefore, there is a possibility that the driver feels senses of strangeness and anxiety against the lane planning by the autonomous driving system. This causes decrease in confidence in the autonomous driving system.

An object of the present disclosure is to provide a technique that can reduce driver's senses of strangeness and anxiety against lane planning by an autonomous driving system.

A first disclosure provides an autonomous driving system mounted on a vehicle.

The autonomous driving system includes:

an information acquisition device configured to acquire driver operation information indicating an operation by a driver of the vehicle; and an autonomous driving control device configured to perform autonomous driving control of the vehicle.

The autonomous driving control device performs:

default lane setting processing that sets a default lane in which the vehicle travels; and vehicle travel control processing that controls the vehicle to travel in the default lane when there is no departure reason for departing from the default lane and to travel away from the default lane until there is no departure reason when there is the departure reason.

In the default lane setting processing, the autonomous driving control device refers to the driver operation information to set the default lane according to the driver's intention.

A second disclosure further has the following features in addition to the first disclosure.

A lane change instruction or a manual lane change operation by the driver is a lane change intended operation indicating a lane change intention of the driver.

In the default lane setting processing in a process of the autonomous driving control, the autonomous driving control device detects the lane change intended operation based on the driver operation information and sets the default lane according to the lane change intention.

A third disclosure further has the following features in addition to the second disclosure.

When the lane change intended operation is detected, the autonomous driving control device updates the default lane to a target lane intended by the lane change intended operation.

A fourth disclosure further has the following features in addition to the second disclosure.

A temporary lane change action is a series of actions that makes a lane change from a first lane to a second lane and then returns from the second lane to the first lane again.

When the lane change intended operation is detected, the autonomous driving control device performs first determination processing that determines whether or not the lane change intended operation is related to the temporary lane change action.

When the lane change intended operation is related to the temporary lane change action, the autonomous driving control device maintains the default lane and performs the vehicle travel control processing to complete the temporary lane change action.

When the lane change intended operation is not related to the temporary lane change action, the autonomous driving control device updates the default lane to a target lane intended by the lane change intended operation.

A fifth disclosure further has the following features in addition to any one of the first to fourth disclosures.

The autonomous driving control device detects an autonomous driving activation instruction by the driver based on the driver operation information.

In response to the autonomous driving activation instruction, the autonomous driving control device activates the autonomous driving control and sets a current lane at a time when the autonomous driving activation instruction is detected, as the default lane.

A sixth disclosure further has the following features in addition to any one of the first to fourth disclosures.

A temporary lane change action is a series of actions that makes a lane change from a first lane to a second lane and then returns from the second lane to the first lane again.

The autonomous driving control device detects an autonomous driving activation instruction by the driver based on the driver operation information.

In response to the autonomous driving activation instruction, the autonomous driving control device activates the autonomous driving control and performs second determination processing that determines whether or not the vehicle is in a process of the temporary lane change action.

When the vehicle is in a process of the temporary lane change action, the autonomous driving control device sets the first lane as the default lane and performs the vehicle travel control processing to complete the temporary lane change action.

When the vehicle is not in a process of the temporary lane change action, the autonomous driving control device sets a current lane at a time when the autonomous driving activation instruction is detected, as the default lane.

A seventh disclosure further has the following features in addition to any one of the first to sixth disclosures.

When there is a lane change reason, the autonomous driving control device makes a proposal of a lane change to the driver.

The autonomous driving control device determines, based on the driver operation information, whether the driver approves or rejects the proposal.

When the driver rejects the proposal, the autonomous driving control device sets a current lane as the default lane.

An eighth disclosure further has the following features in addition to the seventh disclosure.

When the driver approves the proposal, the autonomous driving control device sets a target lane of the proposed lane change as the default lane.

A ninth disclosure further has the following features in addition to the seventh disclosure.

A temporary lane change action is a series of actions that makes a lane change from a first lane to a second lane and then returns from the second lane to the first lane again.

When the driver approves the proposal, the autonomous driving control device performs third determination processing that determines whether or not the proposal is related to the temporary lane change action.

When the proposal is related to the temporary lane change action, the autonomous driving control device maintains the default lane and performs the vehicle travel control processing to complete the temporary lane change action.

When the proposal is not related to the temporary lane change action, the autonomous driving control device sets a target lane of the proposed lane change as the default lane.

As described above, the autonomous driving system according to the present disclosure refers to the driver operation information to set the default lane according to the driver's intention. As a result, the driver's intention is reflected in lane planning by the autonomous driving system. Therefore, the driver's senses of strangeness and anxiety against the lane planning are reduced. This contributes to increase in confidence in the autonomous driving system.

EMBODIMENTS

Embodiments of the present disclosure will be described below with reference to the attached drawings.

1. Outline

Figure 1:
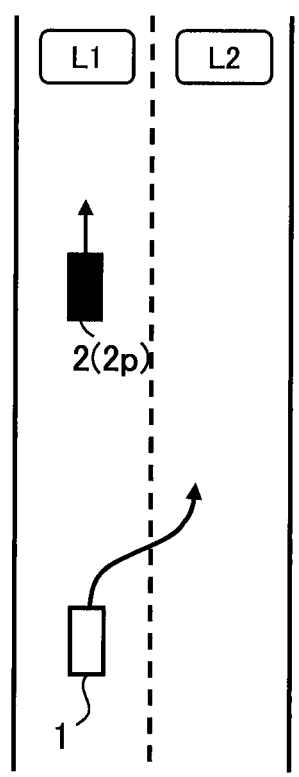
FIG. 1 is a conceptual diagram for explaining an outline of an autonomous driving system according to an embodiment of the present disclosure.

FIG. 1 is a conceptual diagram for explaining an outline of an autonomous driving system according to the present embodiment. The autonomous driving system is mounted on a vehicle 1 and controls autonomous driving of the vehicle 1. In particular, the autonomous driving system performs "lane planning" that plans a lane in which the vehicle 1 travels during the autonomous driving. Then, the autonomous driving system proposes or executes a lane change such that the vehicle 1 travels according to a result of the lane planning.

In general, the lane planning is performed based on a destination as well as situations of surrounding vehicles 2 (see FIG. 1). According to the present embodiment, an intention of a driver of the vehicle 1 (i.e. which lane the driver wants to travel) is further considered in the lane planning.

For example, in FIG. 1, the vehicle 1 during the autonomous driving is traveling in a lane L1. Here, let us consider a case where the driver of the vehicle 1 manually performs a steering operation to make a lane change to an adjacent lane L2. Such the operation for lane change indicates the driver's intention to travel in the lane L2. However, if such the driver's intention is not considered in the lane planning, the autonomous driving system immediately proposes or executes a lane change for returning to the lane L1, in order to achieve keep-left traveling for example. In this case, the driver feels senses of strangeness and anxiety against the autonomous driving system processing that is contrary to the driver's intention. This causes decrease in confidence in the autonomous driving system.

In view of the above, according to the present embodiment, the driver's intention is considered in the lane planning. The driver's intention can be deduced from an operation performed by the driver. Therefore, the autonomous driving system according to the present embodiment acquires driver operation information indicating an operation by the driver, and refers to the driver operation information to perform the lane planning according to the driver's intention.

For example, in the example shown in FIG. 1, the manual lane change operation by the driver indicates the driver's intention to travel in the lane L2. The autonomous driving system detects the manual lane change operation by the driver and recognizes the driver's intention to travel in the lane L2. Then, the autonomous driving system performs the lane planning such that the vehicle 1 basically travels in the lane L2.

A lane in which the vehicle 1 basically travels during the autonomous driving is hereinafter referred to as a "default lane". When the vehicle 1 is away from the default lane, the autonomous driving system performs the lane planning such that the vehicle 1 moves to the default lane. When the vehicle 1 is in the default lane, the autonomous driving system basically maintains that state. Here, "basically" means that the vehicle 1 is allowed to depart from the default lane when there is a reason.

As an example, let us consider a case where the lane L1 in FIG. 1 is the default lane and a preceding vehicle 2p slower than the vehicle 1 exists in front of the vehicle 1. In this case, there is a possibility that the autonomous driving system plans an overtaking action for overtaking the preceding vehicle 2p. The overtaking action is composed of a combination of the following series of actions: (1) making a lane change for moving from the lane L1 to the lane L2, (2) going ahead of the preceding vehicle 2p, and (3) making a lane change for returning from the lane L2 to the lane L1. When performing such the overtaking action, the vehicle 1 is allowed to temporarily depart from the default lane (i.e. the lane L1).

A series of actions that makes a lane change from the lane L1 (the default lane) to the lane L2 and then returns from the lane L2 to the lane L1 again as mentioned above is hereinafter referred to as a "temporary lane change action". The temporary lane change action is not limited to the above-described overtaking action. For example, it is also considered to temporarily depart from the default lane in order to make way for a high-speed vehicle or an emergency vehicle approaching from behind. It is also considered to temporarily depart from the default lane in order to avoid a merging vehicle in a merged section.

As described above, the default lane means a lane in which the vehicle 1 basically travels. When there is no departure reason for departing from the default lane, the autonomous driving system controls the vehicle 1 to travel in the default lane. When there is any departure reason for departing from the default lane, the autonomous driving system controls the vehicle 1 to travel away from the default lane until there is no departure reason.

According to the present embodiment, the default lane is set according to the driver's intention. More specifically, the autonomous driving system according to the present embodiment refers to the driver operation information indicating an operation by the driver to set the default lane according to the driver's intention.

For example, when the driver instructs activation of the autonomous driving, the driver is likely to have an intention to keep traveling in a current lane. In some embodiments, the default lane is set to the current lane.

As another example, when the driver gives a lane change instruction or performs a manual lane change operation, the default lane is set to a target lane of the lane change according to the driver's intention. It should also be noted that the lane change instruction or the manual lane change operation may be performed for the temporary lane change action such as the overtaking action. That is, there is a possibility that the driver's intention is the temporary lane change action. In some embodiments, the default lane is maintained without change.

As still another example, let us consider a case where the autonomous driving system makes a proposal of a lane change to the driver. The driver performs an operation to approve or reject the proposal. When the driver approves the proposal, the driver's intention is to make the proposed lane change. In some embodiments, a target lane of the proposed lane change is set as the default lane. On the other hand, when the driver rejects the proposal, the driver's intention is to maintain the current state without making a lane change. In some embodiments, the default lane is maintained at the current lane.

As described above, the autonomous driving system according to the present embodiment refers to the driver operation information to set the default lane according to the driver's intention. As a result, the driver's intention is reflected in the lane planning by the autonomous driving system. Therefore, the driver's senses of strangeness and anxiety against the lane planning are reduced. This contributes to increase in confidence in the autonomous driving system.

2. Configuration Example of Autonomous Driving System

Figure 2:
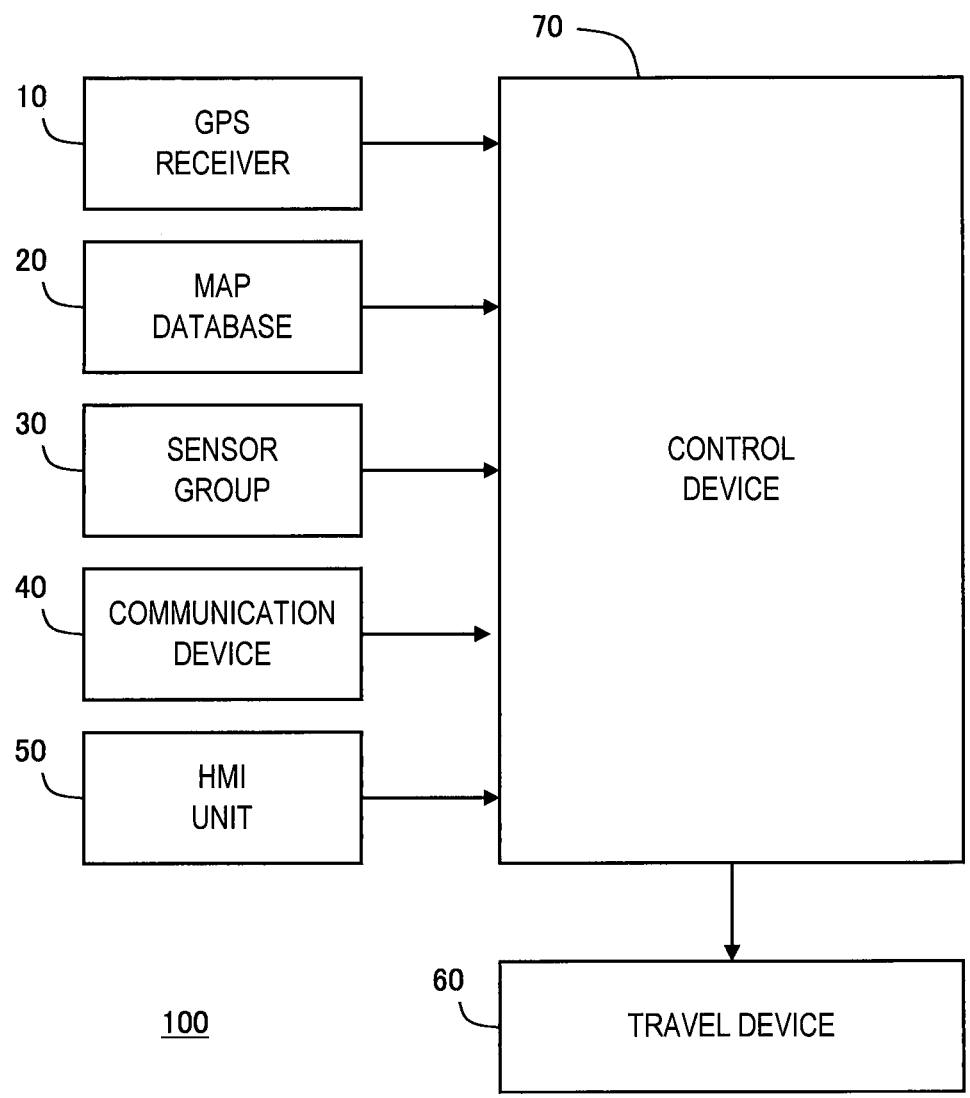
FIG. 2 is a block diagram showing a configuration example of the autonomous driving system according to the embodiment of the present disclosure.

FIG. 2 is a block diagram showing a configuration example of an autonomous driving system 100 according to the present embodiment. The autonomous driving system 100 is mounted on the vehicle 1 and controls the autonomous driving of the vehicle 1. More specifically, the autonomous driving system 100 is provided with a GPS (Global Positioning System) receiver 10, a map database 20, a sensor group 30, a communication device 40, an HMI (Human Machine Interface) unit 50, a travel device 60, and a control device 70.

The GPS receiver 10 receives signals transmitted from a plurality of GPS satellites and calculates a position and a posture (i.e. orientation) of the vehicle 1 based on the received signals. The GPS receiver 10 sends the calculated information to the control device 70.

Information indicating a boundary position of each lane on a map is beforehand recorded in the map database 20. For example, the boundary position of each lane is represented by a group of plural points or lines. The map database 20 is stored in a predetermined storage device.

The sensor group 30 includes a surrounding situation sensor, a vehicle state sensor, and a driving operation sensor. The surrounding situation sensor detects a situation around the vehicle 1. The surrounding situation sensor is exemplified by a LIDAR (LIDAR: Laser Imaging Detection and Ranging), a radar, a camera, and so forth. The vehicle state sensor detects a state of the vehicle 1. For example, the vehicle state sensor includes a vehicle speed sensor that detects a speed of the vehicle 1.

The driving operation sensor detects a driving operation by the driver. For example, the driving operation sensor includes a steering wheel angle sensor, a torque sensor, an accelerator pedal sensor, a brake sensor, and a blinker sensor. The steering wheel angle sensor detects a steering angle of a steering wheel. The torque sensor detects a steering torque at the time of steering. The accelerator pedal sensor detects a stroke amount of an accelerator pedal. The brake sensor detects a stroke amount of a brake pedal. The blinker sensor detects a blinker operation by the driver. The sensor group 30 sends the detected information to the control device 70.

The communication device 40 performs a V2X communication (i.e. a vehicle-to-vehicle communication and a vehicle-to-infrastructure communication). More specifically, the communication device 40 performs a V2V communication (a vehicle-to-vehicle communication) with another vehicle. In addition, the communication device 40 performs a V2I communication (a vehicle-to-infrastructure communication) with an external system (infrastructure). Through the V2X communication, the communication device 40 can acquire information on an environment around the vehicle 1. The communication device 40 sends the acquired information to the control device 70.

The HMI unit 50 is an interface for proving the driver with information and receiving information from the driver. For example, the HMI unit 50 includes an input device, a display device, a speaker, and a microphone. The input device is exemplified by a touch panel, a keyboard, a switch, and a button. By using the input device, the driver can input information to the HMI unit 50. For example, by using the input device, the driver can instruct the autonomous driving system 100 to "activate autonomous driving control" or "make a lane change". As another example, by using the input device, the driver can input response (approve or reject) to a proposal of lane change from the autonomous driving system 100. The HMI unit 50 sends the information input by the driver to the control device 70.

The travel device 60 includes a steering device, a driving device, a braking device, a transmission, and so forth. The steering device turns wheels. The driving device is a power source that generates a driving force. The driving device is exemplified by an engine and an electric motor. The braking device generates a braking force.

The control device 70 performs autonomous driving control that controls the autonomous driving of the vehicle 1. Typically, the control device 70 is a microcomputer including a processor, a memory, and an input/output interface. The control device 70 is also called an ECU (Electronic Control Unit). The control device 70 receives a variety of information through the input/output interface. The control device 70 performs the autonomous driving control based on the received information. More specifically, the control device 70 performs the above-described lane planning and controls the travel device 60 so that the vehicle 1 travels according to a result of the lane planning.

Figure 3:
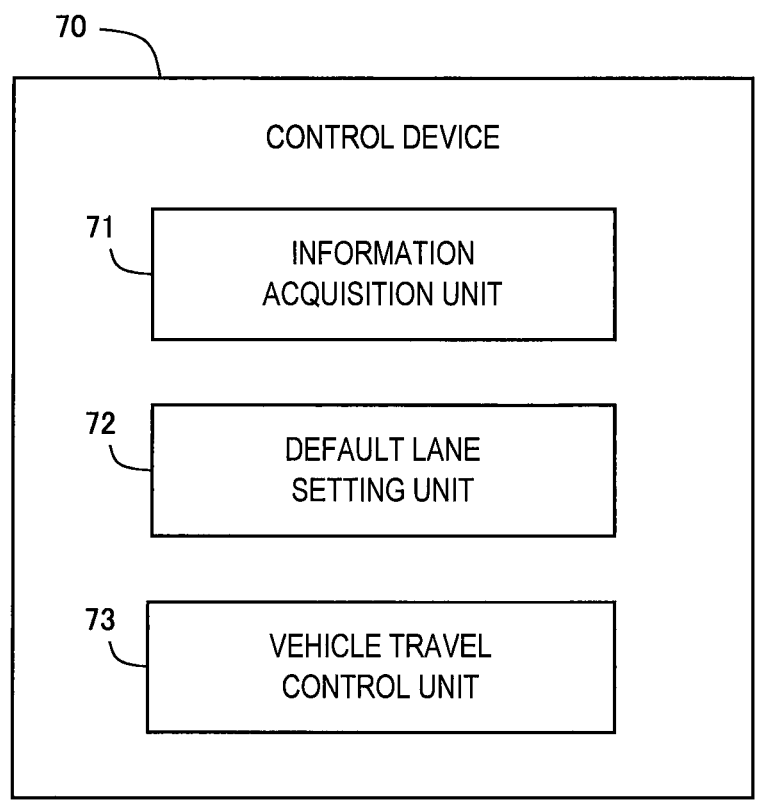
FIG. 3 is a block diagram showing a functional configuration example of a control device of the autonomous driving system according to the embodiment of the present disclosure.

FIG. 3 is a block diagram showing a functional configuration example of the control device 70 according to the present embodiment. The control device 70 includes, as functional blocks, an information acquisition unit 71, a default lane setting unit 72, and a vehicle travel control unit 73. These functional blocks are achieved by the processor of the control device 70 executing a control program stored in the memory. The control program may be recorded on a computer-readable recording medium.

The information acquisition unit 71 performs "information acquisition processing" that acquires information necessary for the autonomous driving control. The default lane setting unit 72 and the vehicle travel control unit 73 perform "autonomous driving control processing" that controls the autonomous driving of the vehicle 1. Hereinafter, each of the information acquisition processing and the autonomous driving control processing in the present embodiment will be described in detail.

3. Information Acquisition Processing

Figure 4:
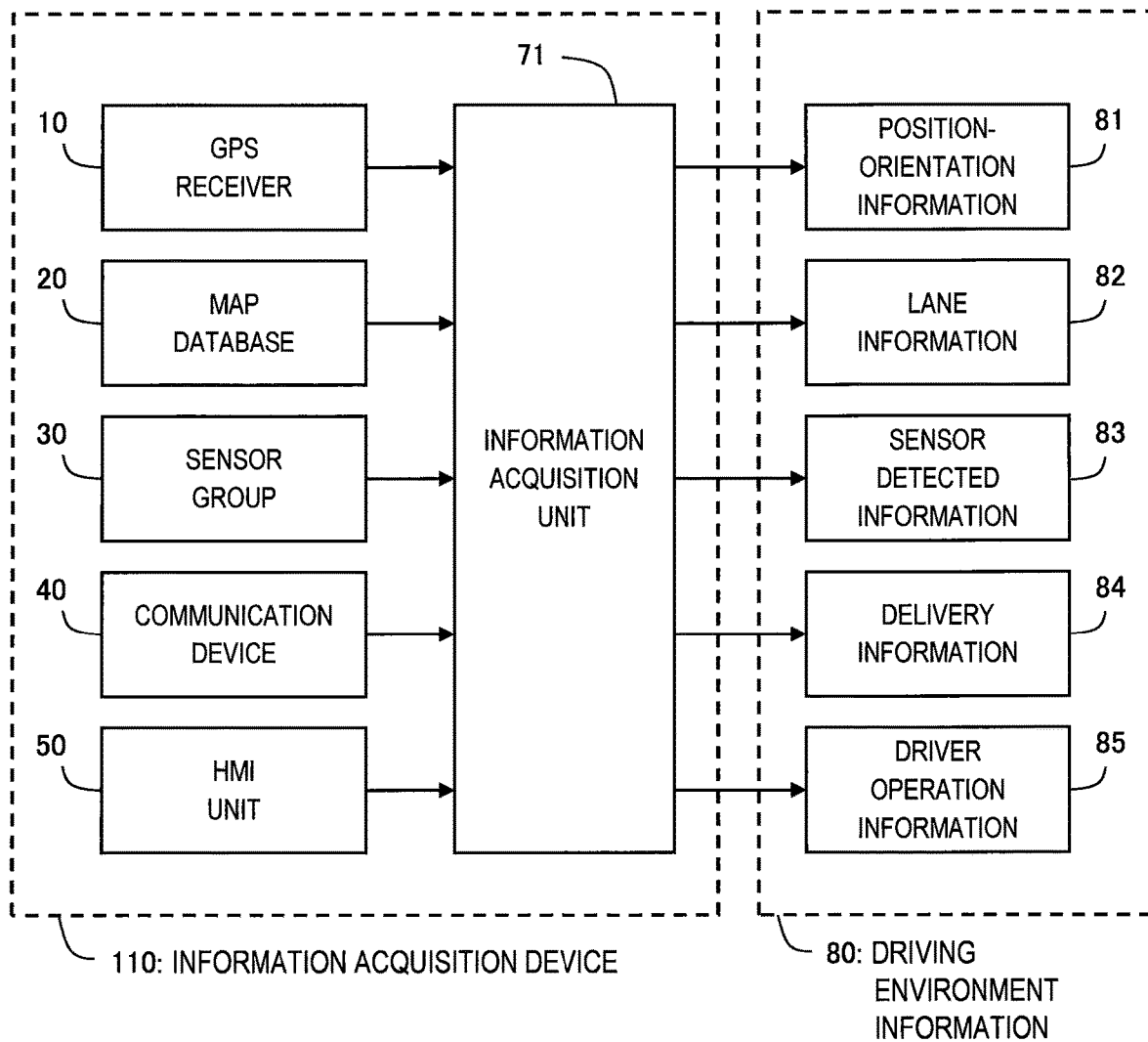
FIG. 4 is a block diagram for explaining information acquisition processing by the autonomous driving system according to the embodiment of the present disclosure.

FIG. 4 is a block diagram for explaining the information acquisition processing according to the present embodiment. In the information acquisition processing, the information acquisition unit 71 acquires information necessary for the autonomous driving control processing. The information acquisition processing is repeatedly executed every certain cycle.

More specifically, the information acquisition unit 71 acquires, from the GPS receiver 10, position-orientation information 81 indicating a current position and a posture (i.e. orientation) of the vehicle 1.

Moreover, the information acquisition unit 71 generates lane information 82 from the map database 20. The lane information 82 is information regarding lanes on the map. More specifically, the lane information 82 indicates a geometry (i.e. position, shape, and orientation) of each lane. Based on the lane information 82, it is possible to recognize lane increase, lane decrease, lane merging, lane branching, intersection, and the like.

Moreover, the information acquisition unit 71 generates sensor detected information 83 based on the information detected by the sensor group 30. For example, the sensor detected information 83 includes the vehicle speed detected by the vehicle speed sensor. In addition, the sensor detected information 83 includes target information regarding a target around the vehicle 1. The target around the vehicle 1 includes a moving target and a stationary target. The moving target is exemplified by the surrounding vehicle 2 (see FIG. 1), a bicycle, a pedestrian, and so forth. Information regarding a moving target includes a position and a speed of the moving target. The stationary target is exemplified by a white line, an obstacle, and the like. Information regarding a stationary target includes a position of the stationary target. Such the target information is generated based on the detected information obtained by the surrounding situation sensor such as the LIDAR, the radar, the camera, and the like.

Moreover, the information acquisition unit 71 receives delivery information 84 through communication by the communication device 40. For example, the delivery information 84 is information delivered from a system (infrastructure) external to the vehicle 1. The delivery information 84 is exemplified by roadwork section information, accident information, traffic regulation information, and so forth.

Moreover, the information acquisition unit 71 acquires driver operation information 85 indicating an operation by the driver. More specifically, the information acquisition unit 71 acquires the driver operation information 85 regarding a driving operation, based on the detected information from the sensor group 30 (specifically, the driving operation sensor). For example, it is possible to detect the driver's steering operation intended to lane change (i.e. a manual lane change operation), based on the detected information from the steering wheel angle sensor, the torque sensor, and the blinker sensor. Furthermore, the information acquisition unit 71 acquires the driver operation information 85 from the HMI unit 50. The driver operation information 85 acquired from the HMI unit 50 is exemplified by an autonomous driving activation instruction, a lane change instruction, a response (approve/reject) to a proposal from the autonomous driving system 100, and so forth.

All of the position-orientation information 81, the lane information 82, the sensor detected information 83, the delivery information 84, and the driver operation information 85 as exemplified above indicate the driving environment for the vehicle 1. Information indicating such the driving environment for the vehicle 1 is hereinafter referred to as "driving environment information 80". That is to say, the driving environment information 80 includes the position-orientation information 81, the lane information 82, the sensor detected information 83, the delivery information 84, and the driver operation information 85.

It can be said that the information acquisition unit 71 of the control device 70 has a function of acquiring the driving environment information 80. As shown in FIG. 4, the information acquisition unit 71 together with the GPS receiver 10, the map database 20, the sensor group 30, the communication device 40, and the HMI unit 50 constitute an "information acquisition device 110". The information acquisition device 110 as a part of the autonomous driving system 100 performs the information acquisition processing described above.

4. Autonomous Driving Control Processing

Figure 5:
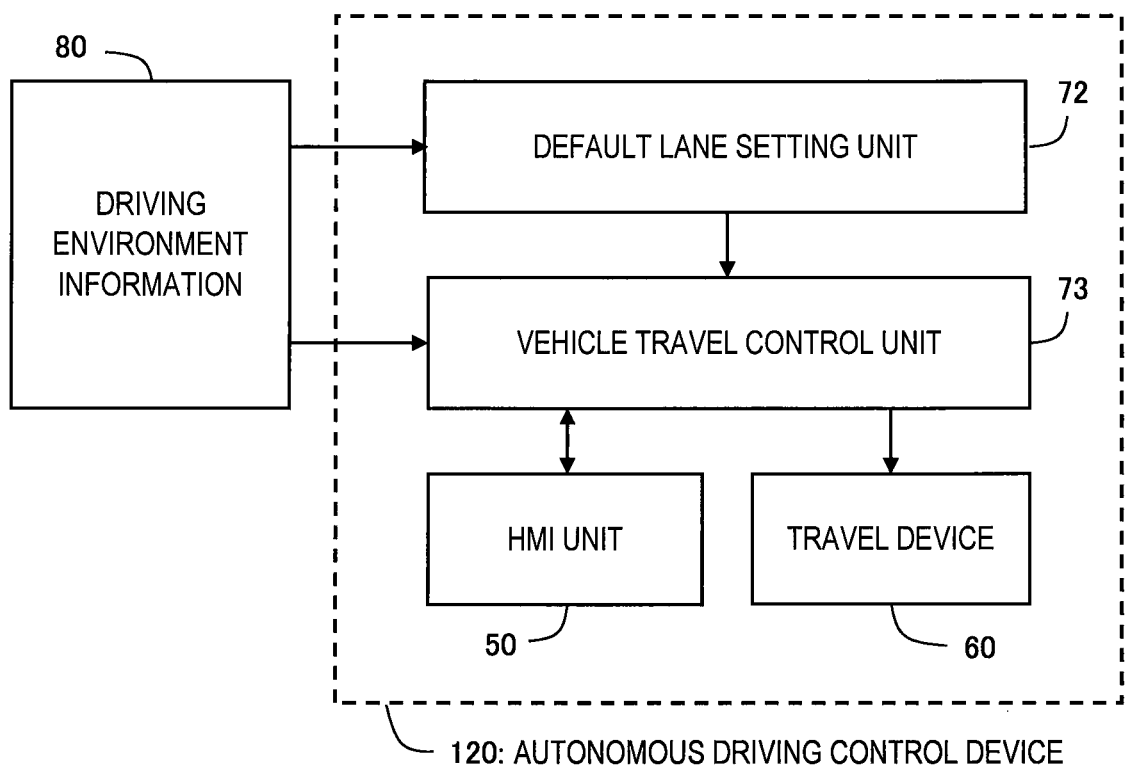
FIG. 5 is a block diagram for explaining autonomous driving control processing by the autonomous driving system according to the embodiment of the present disclosure.

FIG. 5 is a block diagram for explaining the autonomous driving control processing according to the present embodiment. As shown in FIG. 5, the default lane setting unit 72, the vehicle travel control unit 73, the HMI unit 50, and the travel device 60 constitute an "autonomous driving control device 120" that performs autonomous driving control of the vehicle 1. The autonomous driving control device 120 as a part of the autonomous driving system 100 performs the autonomous driving control processing based on the driving environment information 80 described above. In the present embodiment, "default lane setting processing" performed by the default lane setting unit 72 and "vehicle travel control processing" performed by the vehicle travel control unit 73 will be described in particular.

4-1. Default Lane Setting Processing

The default lane setting unit 72 performs default lane setting processing that sets the default lane in which the vehicle 1 basically travels. More specifically, the default lane setting unit 72 refers to the driving environment information 80, especially the driver operation information 85 to set the default lane according to the driver's intention. Hereinafter, various examples of setting of the default lane will be described.

First Example

Figure 6:
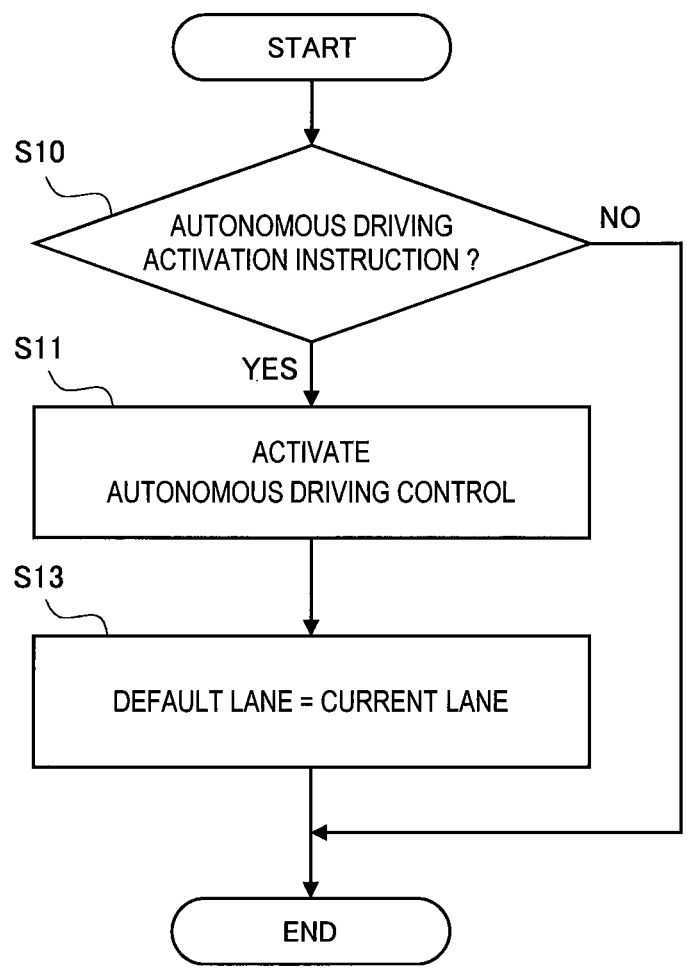
FIG. 6 is a flow chart showing a first example of default lane setting processing according to the embodiment of the present disclosure.

FIG. 6 is a flow chart showing a first example of the default lane setting processing according to the present embodiment. The first example relates to setting of the default lane at a time of activating (starting) the autonomous driving control.

Step S10:

The driver uses the input device of the HMI unit 50 to input an "autonomous driving activation instruction" that instructs activation of the autonomous driving control. The default lane setting unit 72 determines, based on the driver operation information 85, whether or not the autonomous driving activation instruction is input. That is, the default lane setting unit 72 performs detection of the autonomous driving activation instruction based on the driver operation information 85. When the autonomous driving activation instruction is detected (Step S10; Yes), the processing proceeds to Step S11. On the other hand, when the autonomous driving activation instruction is not detected (Step S10; No), the processing in the current cycle ends.

Step S11:

In response to the autonomous driving activation instruction, the autonomous driving control device 120 activates (starts) the autonomous driving control. After that, the processing proceeds to Step S13.

Step S13:

When the driver inputs the autonomous driving activation instruction, the driver is likely to have an intention to keep traveling in the current lane. Therefore, the default lane setting unit 72 sets the current lane at the time when the autonomous driving activation instruction is detected, as the default lane.

Second Example

Figure 7:
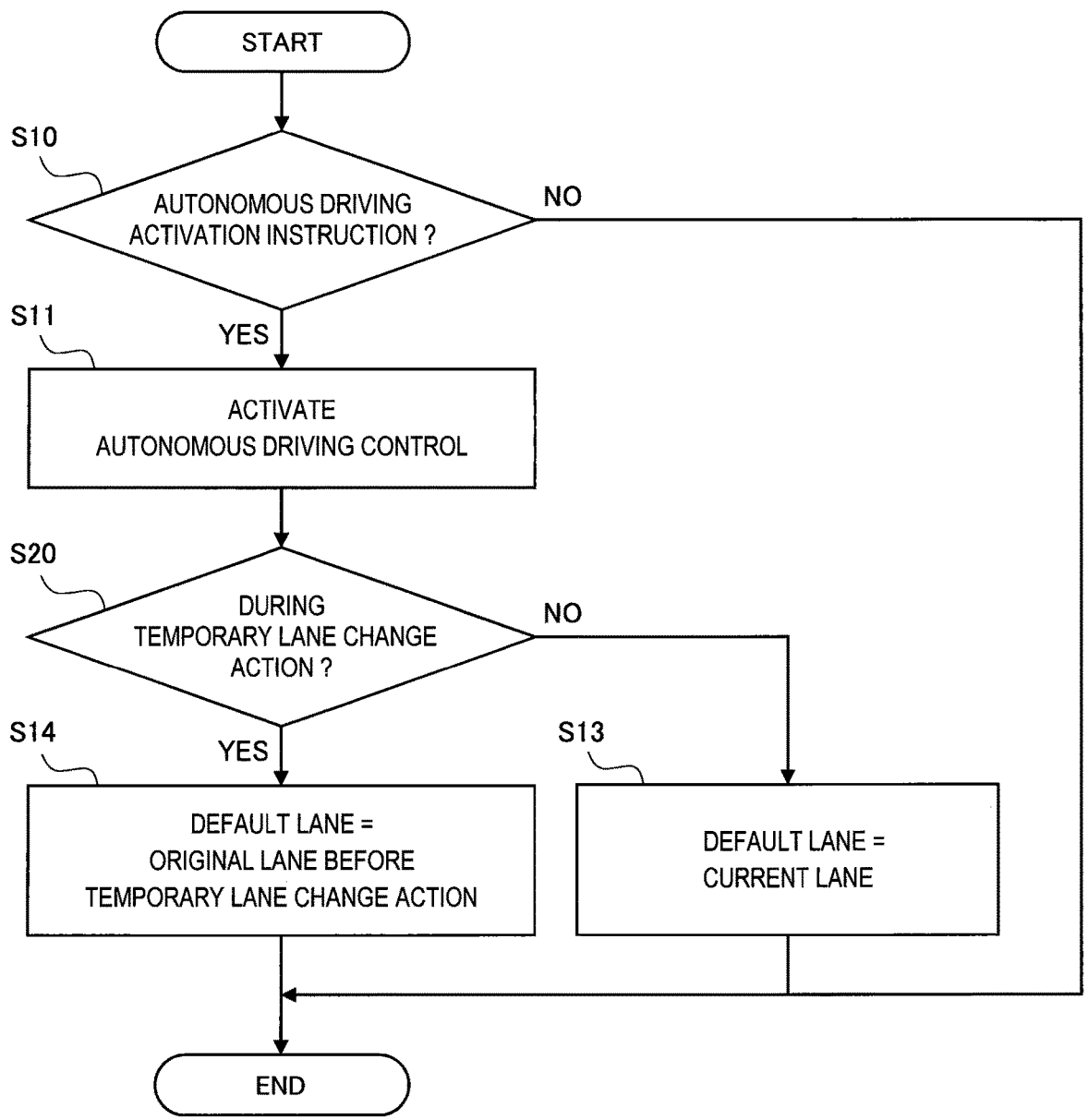
FIG. 7 is a flow chart showing a second example of the default lane setting processing according to the embodiment of the present disclosure.

FIG. 7 is a flow chart showing a second example of the default lane setting processing according to the present embodiment. The second example is a modification example of the first example. Overlapping descriptions with the first example will be omitted as appropriate.

As described above, the "temporary lane change action" means a series of actions that makes a lane change from a first lane to a second lane and then returns from the second lane to the first lane again. A typical example of the temporary lane change action is an overtaking action for overtaking a preceding vehicle 2p (see FIG. 1). Another example of the temporary lane change action is an action for making way for a high-speed vehicle or an emergency vehicle approaching from behind. Still another example of the temporary lane change action is an action for avoiding a merging vehicle in a merged section. Still another example of the temporary lane change action is an action for avoiding a roadwork section or an accident vehicle.

There is also a possibility that the driver inputs the autonomous driving activation instruction in a process of the temporary lane change action. In view of the above, according to the second example, when the autonomous driving activation instruction is input (Step S10; Yes), the default lane setting unit 72 determines whether or not the vehicle 1 is in the process of the temporary lane change action (Step S20). In the flow shown in FIG. 7, Step S20 is inserted after Step S11.

When the vehicle 1 is not in the process of the temporary lane change action (Step S20; No), the processing proceeds to the above-described Step S13. That is, as in the case of the first example described above, the default lane setting unit 72 sets the current lane at the time when the autonomous driving activation instruction is detected, as the default lane.

On the other hand, when the vehicle 1 is in the process of the temporary lane change action (Step S20; Yes), the driver's intention is not to keep traveling in the current lane but to complete the temporary lane change action. Therefore, the processing proceeds to Step S14 instead of Step S13. At Step S14, the default lane setting unit 72 sets the first lane (i.e. the original lane in which the vehicle 1 has traveled before start of the temporary lane change action) as the default lane. In this case, vehicle travel control processing (to be described later) is performed such that the temporary lane change action is completed.

Figure 8:
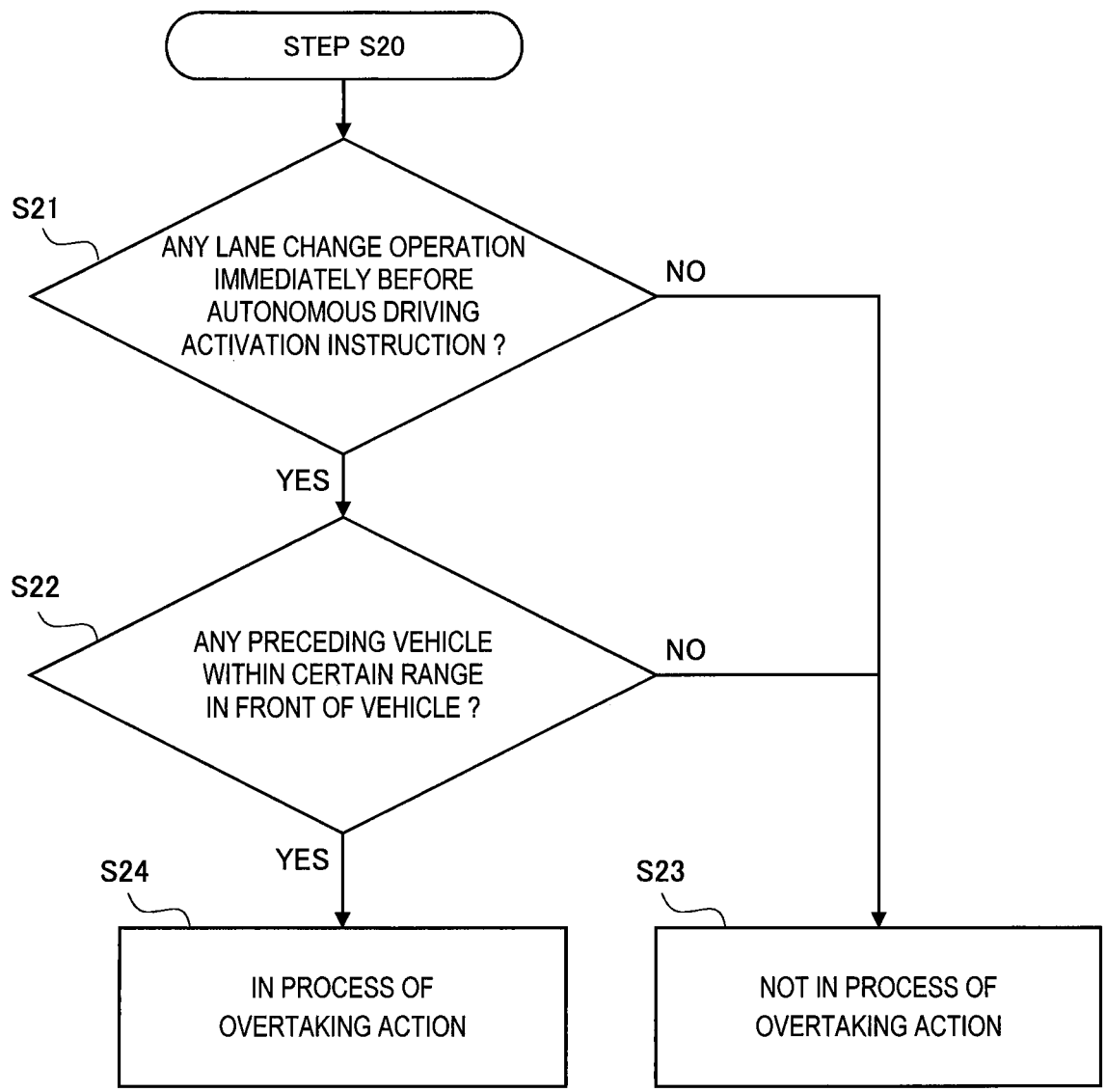
FIG. 8 is a flow chart showing an example of determination processing at Step S20 in FIG. 7.

FIG. 8 is a flow chart showing an example of the determination processing at Step S20 in FIG. 7. Here, let us consider an overtaking action as an example of the temporary lane change action.

Step S21:

The default lane setting unit 72 determines, based on the driver operation information 85 and the lane information 82, whether or not any lane change operation (specifically, a steering operation) is performed by the driver immediately before the autonomous driving activation instruction. Here, "immediately before the autonomous driving activation instruction" means "within a certain period of time before the autonomous driving activation instruction". When any lane change operation is performed (Step S21; Yes), the processing proceeds to Step S22. On the other hand, when no lane change operation is performed (Step S21; No), the processing proceeds to Step S23.

Step S22:

An original lane is a lane in which the vehicle 1 has traveled before start of the lane change operation detected at Step S21. The default lane setting unit 72 determines whether or not any preceding vehicle $2p$ slower than vehicle 1 exists within a certain range of the original lane in front of the vehicle 1 at the timing when the lane change operation is performed. Such the determination can be performed based on the driving environment information 80 (specifically, the lane information 82 and the sensor detected information 83). Where there is no preceding vehicle $2p$ (Step S22; No), the processing proceeds to Step S23. On the other hand, when there is any preceding vehicle $2p$ (Step S22; Yes), the processing proceeds to Step S24.

Step S23:

The default lane setting unit 72 judges that the vehicle 1 is not in the process of the overtaking action. In this case, the processing proceeds to Step S13 in FIG. 7.

Step S24:

The default lane setting unit 72 judges that the vehicle 1 is in the process of the overtaking action. In this case, the processing proceeds to Step S14 in FIG. 7.

The same applies to the temporary lane change action other than the overtaking action. A high-speed vehicle or an emergency vehicle approaching from behind, a merging vehicle in a merged section, a roadwork section, an accident vehicle, and the like can be detected based on the driving environment information 80.

Third Example

Figure 9:
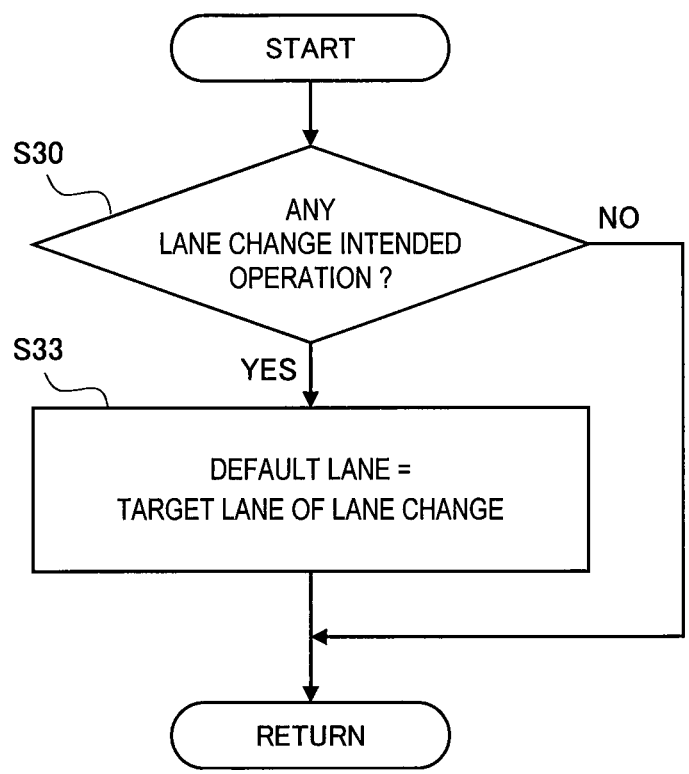
FIG. 9 is a flow chart showing a third example of the default lane setting processing according to the embodiment of the present disclosure.

FIG. 9 is a flow chart showing a third example of the default lane setting processing according to the present embodiment. The third example relates to setting of the default lane during the autonomous driving control.

Step S30:

A lane change instruction or a manual lane change operation by the driver is hereinafter referred to as a "lane change intended operation". The lane change intended operation obviously indicates a lane change intention of the driver. The default lane setting unit 72 determines, based on the driver operation information 85, whether or not any lane change intended operation is performed by the driver. That is, based on the driver operation information 85, the default lane setting unit 72 performs detection of the lane change intended operation by the driver. When any lane change intended operation is detected (Step S30; Yes), the processing proceeds to Step S33. On the other hand, when no lane change intended operation is detected (Step S30; No), the processing in the current cycle ends.

Step S33:

The lane change intended operation obviously indicates the lane change intention of the driver. Therefore, the default lane setting unit 72 updates the default lane to a target lane intended by the lane change intended operation. As an example, let us consider a case where the vehicle 1 travels in the lane L1 (see FIG. 1) as the default lane and then the driver performs a manual lane change operation to make a lane change to the lane L2. In this case, the default lane setting unit 72 updates the default lane from the lane L1 to the lane L2 according to the lane change intention of the driver.

Fourth Example

Figure 10:
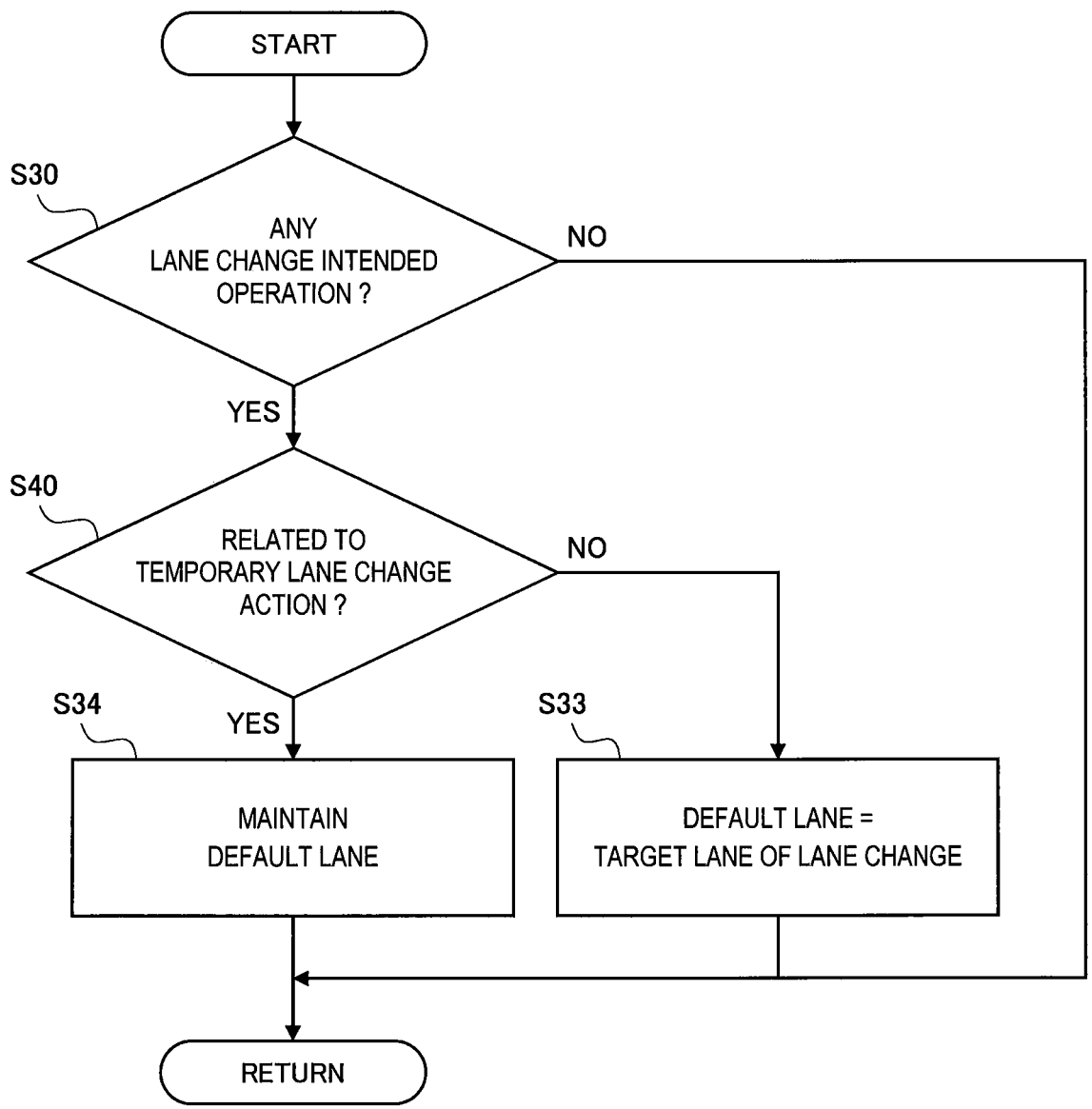
FIG. 10 is a flow chart showing a fourth example of the default lane setting processing according to the embodiment of the present disclosure.

FIG. 10 is a flow chart showing a fourth example of the default lane setting processing according to the present embodiment. The fourth example is a modification example of the third example. Overlapping descriptions with the third example will be omitted as appropriate.

In the fourth example, the above-described temporary lane change action also is taken into consideration. There is a possibility that a lane change performed by the driver is not a mere lane change but a lane change for the temporary lane change action. In view of the above, according to the fourth example, when a lane change intended operation is detected (Step S30; Yes), the default lane setting unit 72 determines whether or not the detected lane change intended operation is related to the temporary lane change action (Step S40).

When the lane change intended operation is not related to the temporary lane change action (Step S40; No), the processing proceeds to the above-described Step S33. That is, as in the case of the third example described above, the default lane setting unit 72 updates the default lane to a target lane intended by the lane change intended operation.

On the other hand, when the lane change intended operation is related to the temporary lane change action (Step S40; Yes), the driver's intention is not a mere lane change but to complete the temporary lane change action. Therefore, the processing proceeds to Step S34 instead of Step S33. At Step S34, the default lane setting unit 72 maintains the default lane without change. In this case, vehicle travel control processing (to be described later) is performed such that the temporary lane change action is completed.

Figure 11:
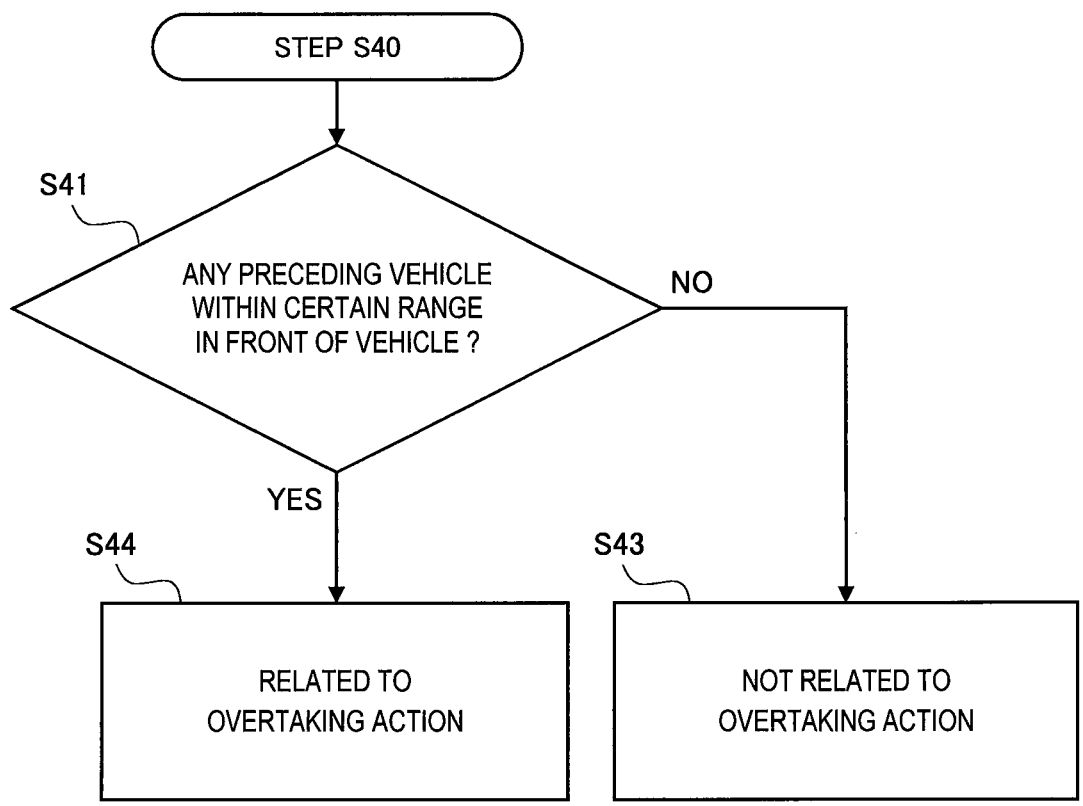
FIG. 11 is a flow chart showing an example of determination processing at Step S40 in FIG. 10.

FIG. 11 is a flow chart showing an example of the determination processing at Step S40 in FIG. 10. Here, let us consider an overtaking action as an example of the temporary lane change action.

Step S41:

An original lane is a lane in which the vehicle 1 has traveled before the lane change intended operation detected at Step S30. The default lane setting unit 72 determines whether or not any preceding vehicle $2p$ slower than vehicle 1 exists within a certain range of the original lane in front of the vehicle 1 at the timing when the lane change intended operation is performed. Such the determination can be performed based on the driving environment information 80 (specifically, the lane information 82 and the sensor detected information 83). Where there is no preceding vehicle $2p$ (Step S41; No), the processing proceeds to Step S43. On the other hand, when there is any preceding vehicle $2p$ (Step S41; Yes), the processing proceeds to Step S44.

Step S43:

The default lane setting unit 72 judges that the lane change intended operation is not related to the overtaking action. In this case, the processing proceeds to Step S33 in FIG. 10.

Step S44:

The default lane setting unit 72 judges that the lane change intended operation is related to the overtaking action. In this case, the processing proceeds to Step S34 in FIG. 10.

The same applies to the temporary lane change action other than the overtaking action. A high-speed vehicle or an emergency vehicle approaching from behind, a merging vehicle in a merged section, a roadwork section, an accident vehicle, and the like can be detected based on the driving environment information 80.

Fifth Example

Figure 12:
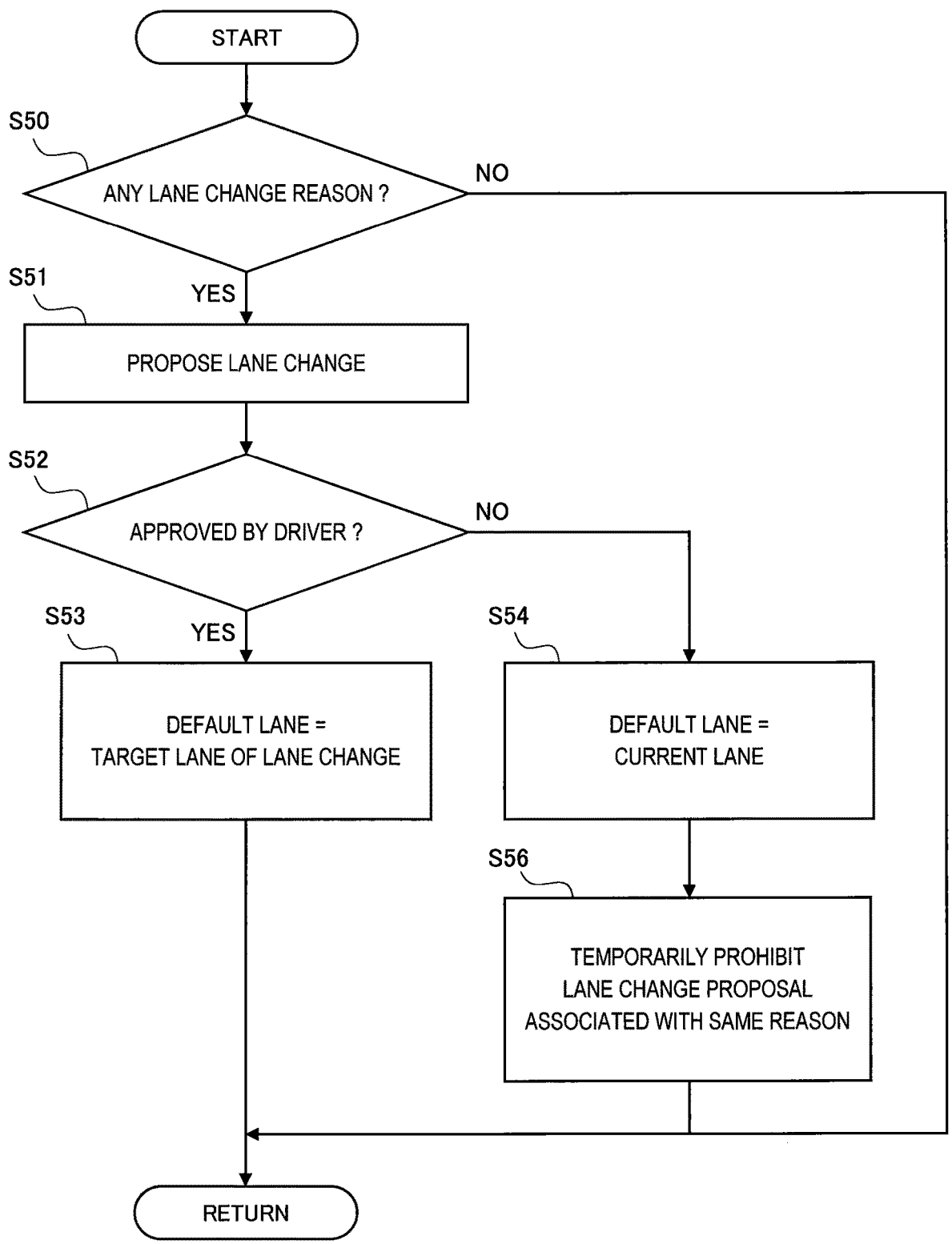
FIG. 12 is a flow chart showing a fifth example of the default lane setting processing according to the embodiment of the present disclosure.

FIG. 12 is a flow chart showing a fifth example of the default lane setting processing according to the present embodiment. In the fifth example, a case where the autonomous driving control device 120 makes a proposal of a lane change to the driver is considered.

Step S50:

A reason for the autonomous driving control device 120 to make a proposal of a lane change to the driver is hereinafter referred to as a "lane change reason". Various examples can be considered as the lane change reason.

For example, when a lane in which the vehicle 1 is traveling ends in front of the vehicle 1, there is a possibility that the autonomous driving control device 120 proposes to make a lane change in advance. As another example, when the vehicle 1 is traveling in a slower traffic lane, there is a possibility that the autonomous driving control device 120 proposes to make a lane change in order to leave the slower traffic lane. These lane change reasons can be detected based on the lane information 82.

As another example, when there is an obstacle in front of the vehicle 1, there is a possibility that the autonomous driving control device 120 proposes to make a lane change in order to avoid the obstacle. This lane change reason can be detected based on the sensor detected information 83.

As still another example, when there is a roadwork section or an accident vehicle in front of the vehicle 1, there is a possibility that the autonomous driving control device 120 proposes to make a lane change in order to avoid the roadwork section or the accident vehicle. This lane change reason can be detected based on the delivery information 84 (specifically, the roadwork section information and the accident information).

In this manner, the autonomous driving control device 120 can determine, based on the driving environment information 80, where or not there is any lane change reason. When there is no lane change reason (Step S50; No), the processing in the current cycle ends. On the other hand, when there is any lane change reason (Step S50; Yes), the processing proceeds to Step S51.

Step S51:

The autonomous driving control device 120 makes a proposal of a lane change to the driver through the HMI unit 50. For example, the autonomous driving control device 120 displays a proposal of a lane change on the display device. Alternatively, the autonomous driving control device 120 may use the speaker to give an audio proposal of a lane change.

Step S52:

The driver uses the input device of the HMI unit 50 to input a response (approve or reject) to the proposal from the autonomous driving system 100. The default lane setting unit 72 determines, based on the driver operation information 85, whether the driver approves or rejects the proposal.

When the driver approves the proposal (Step S52; Yes), the processing proceeds to Step S53. On the other hand, when the driver rejects the proposal (Step S52; No), the processing proceeds to Step S54.

Step S53:

When the driver approves the proposal, the driver's intention is to make the proposed lane change. Therefore, the default lane setting unit 72 sets a target lane of the proposed lane change as the default lane.

Step S54:

When the driver rejects the proposal, the driver's intention is to maintain the current state without making a lane change. Therefore, the default lane setting unit 72 sets the current lane as the default lane.

Step S56:

When the driver rejects the proposal, the autonomous driving control device 120 at least temporarily prohibits another lane change proposal associated with the same reason as the lane change reason at Step S50. Accordingly, it is possible to suppress a troublesome situation where the driver repeatedly rejects the same proposal.

Sixth Example

Figure 13:
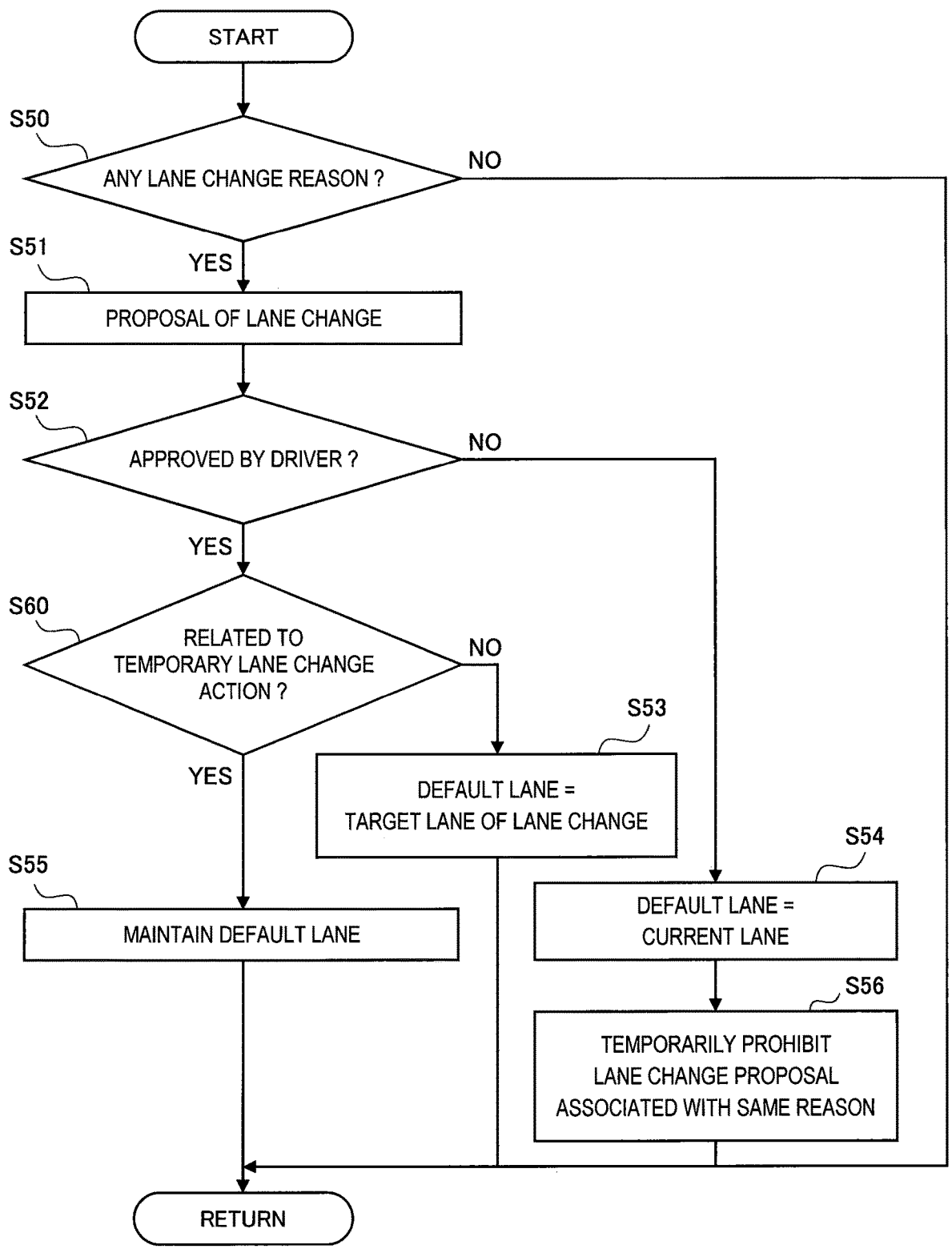
FIG. 13 is a flow chart showing a sixth example of the default lane setting processing according to the embodiment of the present disclosure.

FIG. 13 is a flow chart showing a sixth example of the default lane setting processing according to the present embodiment. The sixth example is a modification example of the fifth example. Overlapping descriptions with the fifth example will be omitted as appropriate.

There is also a possibility that the lane change proposed by the autonomous driving control device 120 is not a mere lane change but a lane change for the temporary lane change action. For example, when there is a slow preceding vehicle 2p (see FIG. 1) in front of the vehicle 1, there is a possibility that the autonomous driving control device 120 proposes to perform an overtaking action in order to overtake the preceding vehicle 2p. Such the preceding vehicle 2p (i.e. the lane change reason) can be detected based on the sensor detected information 83.

In the sixth example, such the temporary lane change action also is taken into consideration. More specifically, according to the sixth example, when the driver approves the proposal (Step S52; Yes), the processing proceeds to Step S60. At Step S60, the default lane setting unit 72 determines whether or not the approved proposal is related to the temporary lane change action. The determination at Step S60 can be performed in a similar manner to that at the above-described Step S40 (see FIG. 11).

When the approved proposal is not related to the temporary lane change action (Step S60; No), the processing proceeds to the above-described Step S53. That is, as in the case of the fifth example described above, the default lane setting unit 72 sets a target lane of the proposed lane change as the default lane.

When the approved proposal is related to the temporary lane change action (Step S60; Yes), the driver's intention is not a mere lane change but to complete the temporary lane change action. Therefore, the processing proceeds to Step S55 instead of Step S53. At Step S55, the default lane setting unit 72 maintains the default lane without change. In this case, vehicle travel control processing (to be described later) is performed such that the temporary lane change action is completed.

4-2. Vehicle Travel Control Processing

The vehicle travel control unit 73 performs lane planning that plans a lane in which the vehicle 1 travels. Then, the vehicle travel control unit 73 proposes or executes a lane change such that the vehicle 1 travels according to a result of the lane planning. Proposal of a lane change to the driver is performed through the HMI unit 50. Execution of a lane change is achieved by appropriately controlling the travel device 60.

According to the present embodiment, the default lane set in the above-described default lane setting processing is considered in the lane planning. That is, when the vehicle 1 is away from the default lane, the vehicle travel control unit 73 performs the lane planning such that the vehicle 1 moves to the default lane. When the vehicle 1 is in the default lane, the vehicle travel control unit 73 basically maintains that state.

It should be noted however that the vehicle 1 is allowed to temporarily depart from the default lane in the process of the temporary lane change action. For example, in the process of an overtaking action for overtaking a slow preceding vehicle 2p, the vehicle 1 temporarily departs from the default lane and travels in another lane to overtake the preceding vehicle 2p. After the vehicle 1 overtakes the preceding vehicle 2p, the vehicle travel control unit 73 makes a lane change for returning the vehicle 1 back to the default lane and completes the temporary lane change action.

According to the default lane setting processing described above, the default lane is set in consideration of the driver's intention. Since the lane planning is performed based on the default lane, the driver's intention is reflected in the lane planning. As a result, the driver's senses of strangeness and anxiety against the lane planning are reduced.

In some embodiments, not only the default lane but also the driving environment for the vehicle 1 is considered in the lane planning according to the present embodiment. The driving environment for the vehicle 1 can be obtained from the driving environment information 80.

For example, when a lane in which the vehicle 1 is traveling ends in front of the vehicle 1, the vehicle travel control unit 73 may execute a lane change regardless of the default lane. In this case, the default lane setting unit 72 may update the default lane to a lane after the lane change, irrespective of the driver's intention.

As another example, when it is necessary to enter a branch lane ahead in order to arrive at a destination, the vehicle travel control unit 73 may beforehand execute a lane change for approaching the branch lane, regardless of the default lane. In this case, the default lane setting unit 72 may update the default lane to a lane after the lane change, irrespective of the driver's intention.

As still another example, when there is an obstacle in front of the vehicle 1, the vehicle travel control unit 73 may execute a lane change for avoiding the obstacle, regardless of the default lane. In this case, the default lane setting unit 72 may update the default lane to a lane after the lane change, irrespective of the driver's intention.

The temporary lane change action, the lane end, the lane branching, the obstacle, and the like are examples of the "departure reason" for the vehicle 1 to depart from the default lane. According to the present embodiment, when there is no departure reason, the vehicle travel control unit 73 controls the vehicle 1 to travel in the default lane. On the other hand, when there is any departure reason, the vehicle travel control unit 73 controls the vehicle 1 to travel away from the default lane until there is no departure reason. Various examples can be considered as a method of such the vehicle travel control processing. Hereinafter, an example of the vehicle travel control processing will be described.

Figure 14:
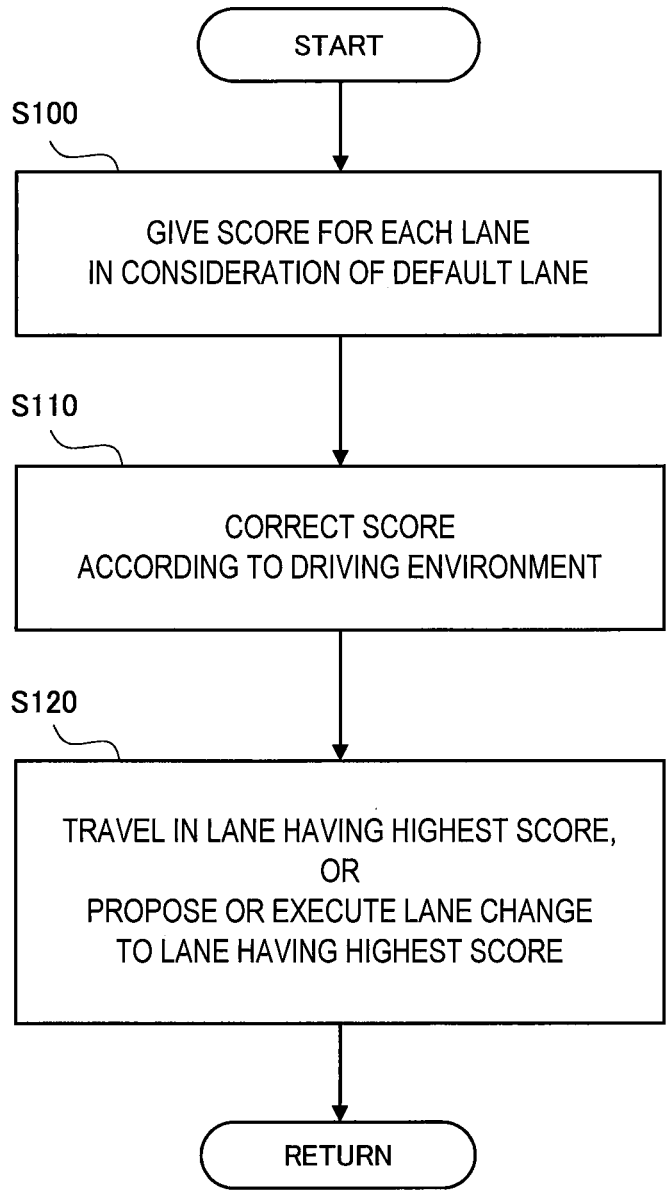
FIG. 14 is a flow chart showing an example of vehicle travel control processing according to the embodiment of the present disclosure.

FIG. 14 is a flow chart showing an example of the vehicle travel control processing according to the present embodiment. In the example shown in FIG. 14, a "score" is given for each lane. The score is used as reference for determining a lane in which the vehicle 1 actually travels. That is, a lane having the highest score is selected as a lane in which the vehicle 1 actually travels.

More specifically, at Step S100, the vehicle travel control unit 73 gives a score for each lane in consideration of the default lane. Here, the score is given such that the score of the default lane is the highest and the score decreases as away from default lane. As a result, the driver's intention is reflected in the score.

At Step S110, the vehicle travel control unit 73 determines, based on the driving environment indicated by the driving environment information 80, whether or not there is any departure reason for the vehicle 1 to depart from the default lane. As mentioned above, the departure reason is exemplified by a temporary lane change action, lane end, lane branching, an obstacle, and so forth. When there is a departure reason, the vehicle travel control unit 73 corrects the score such that a lane change according to the departure reason is performed. In other words, the vehicle travel control unit 73 corrects the score according to the driving environment.

At Step S120, the vehicle travel control unit 73 controls the vehicle 1 to travel in a lane having the highest score. In some cases, the vehicle travel control unit 73 proposes or executes a lane change to a lane having the highest score. After the score is corrected at Step S110, the score of the default lane is not necessarily the highest. Therefore, when there is the departure reason, a lane change to a lane different from the default lane may be proposed or executed.

4-3. Various Examples of Autonomous Driving Control Processing

Hereinafter, various examples of the autonomous driving control processing according to the present embodiment will be described. In the examples described below, there are three lanes L1, L2, and L3. The lane L1 is located at the leftmost side, the lane L2 is located at center, and the lane L3 is located at the rightmost side.

First Example

Figure 15:
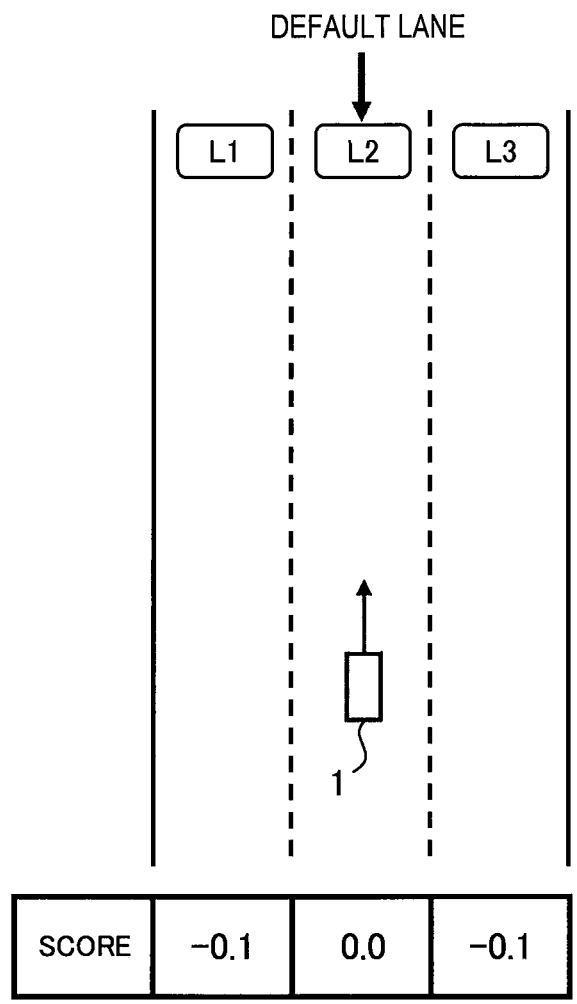
FIG. 15 is a conceptual diagram for explaining a first example of the autonomous driving control processing according to the embodiment of the present disclosure.

FIG. 15 is a conceptual diagram for explaining a first example of the autonomous driving control processing according to the present embodiment. When the vehicle 1 travels in the lane L2 by manual driving, the driver inputs the autonomous driving activation instruction (see FIG. 6, Step S10; Yes). The autonomous driving control device 120 (see FIG. 5) sets the current lane L2 as the default lane (Step S13). The autonomous driving control device 120 gives a score for each lane in consideration of the default lane (see FIG. 14, Step S100). For example, the score of the lane L2 (the default lane) is 0.0, and the score of each of the other lanes L1 and L3 is −0.1. The autonomous driving control device 120 controls the vehicle 1 to keep traveling in the lane L2 having the highest score (Step S120).

Second Example

Figure 16:
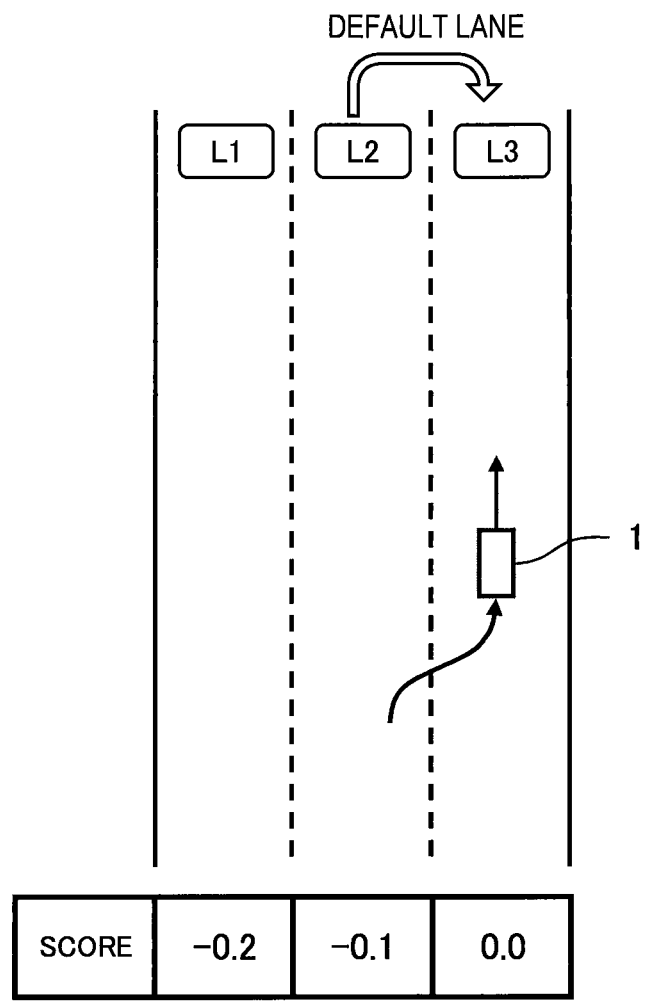
FIG. 16 is a conceptual diagram for explaining a second example of the autonomous driving control processing according to the embodiment of the present disclosure.

FIG. 16 is a conceptual diagram for explaining a second example of the autonomous driving control processing according to the present embodiment. At first, the default lane is the lane L2, and the vehicle 1 travels in the lane L2 by the autonomous driving. After that, the driver performs a manual lane change operation and thereby the vehicle 1 moves from the lane L2 to the lane L3 (see FIG. 9, Step S30; Yes). The autonomous driving control device 120 updates the default lane from the lane L2 to the lane L3 according to the driver's intention (Step S33). In response to the update of the default lane, the autonomous driving control device 120 updates the score of each lane accordingly (see FIG. 14, Step S100). For example, the score of the lane L3 (the default lane) is 0.0, the score of the lane L2 is −0.1, and the score of the lane L1 is −0.2. The autonomous driving control device 120 controls the vehicle 1 to keep traveling in the lane L3 having the highest score (Step S120).

Third Example

Figure 17:
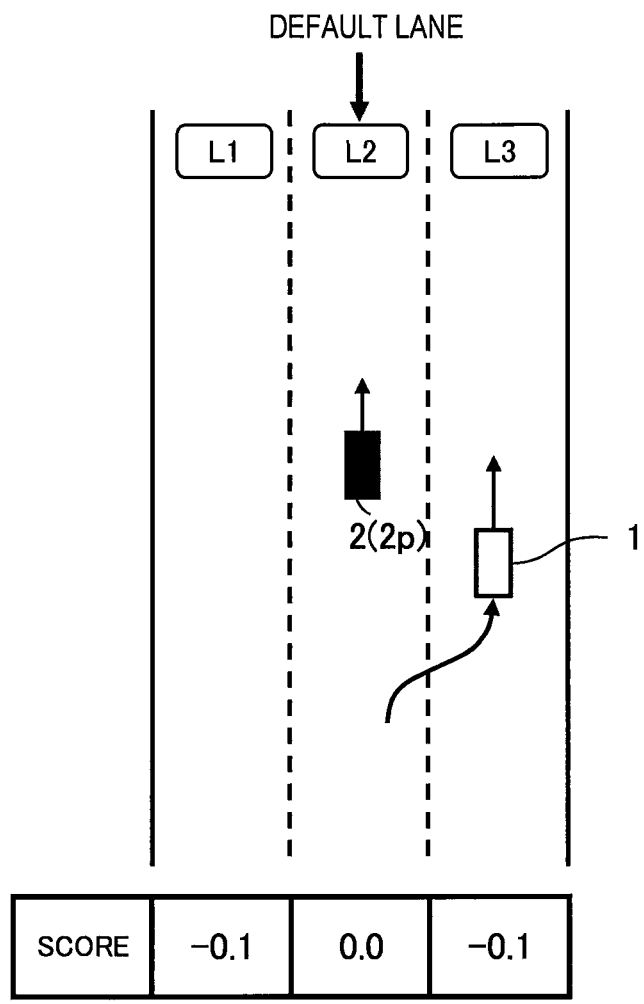
FIG. 17 is a conceptual diagram for explaining a third example of the autonomous driving control processing according to the embodiment of the present disclosure.

FIG. 17 is a conceptual diagram for explaining a third example of the autonomous driving control processing according to the present embodiment. At first, the default lane is the lane L2, the vehicle 1 travels in the lane L2 by the autonomous driving, and there is a slow preceding vehicle 2p in front of the vehicle 1. The driver performs a manual lane change operation for overtaking the preceding vehicle 2p and thereby the vehicle 1 moves from the lane L2 to the lane L3 (see FIG. 10, Step S30; Yes). The autonomous driving control device 120 recognizes the overtaking action (Step S40; Yes) and thus maintains the default lane at the lane L2 (Step S34). After the vehicle 1 travels in the lane L3 and overtakes the preceding vehicle 2p, the autonomous driving control device 120 executes a lane change to the lane L2 (the default lane) having the highest score (see FIG. 14, Step S120). In this manner, the overtaking action is completed.

Fourth Example

Figure 18:
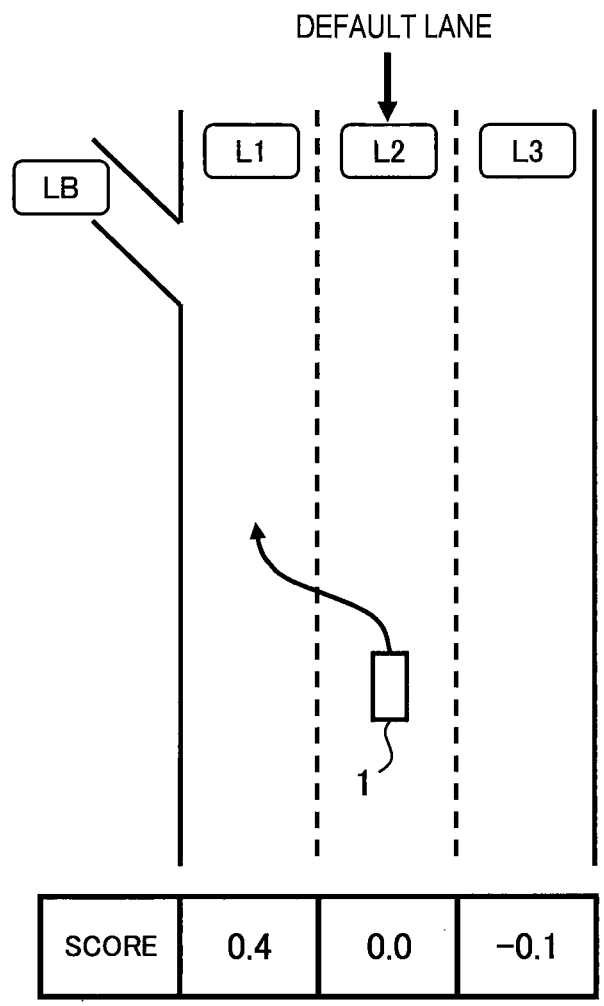
FIG. 18 is a conceptual diagram for explaining a fourth example of the autonomous driving control processing according to the embodiment of the present disclosure.

FIG. 18 is a conceptual diagram for explaining a fourth example of the autonomous driving control processing according to the present embodiment. At first, the default lane is the lane L2, and the vehicle 1 travels in the lane L2 by the autonomous driving. The score of the lane L2 (the default lane) is 0.0, and the score of each of the other lanes L1 and L3 is −0.1 (see FIG. 14, Step S100).

After that, the autonomous driving control device 120 detects a branch lane LB ahead based on the driving environment information 80 (specifically, the lane information 82). It is necessary to enter the branch lane LB in order to arrive at a destination. To this end, it is necessary to beforehand make a lane change from the current lane L2 to the lane L1, regardless of the driver's intention. Accordingly, the autonomous driving control device 120 corrects the score (see FIG. 14, Step S110). For example, the autonomous driving control device 120 adds 0.5 to the score of the lane L1. As a result, as shown in FIG. 18, the score of the lane L1 becomes 0.4. Then, the autonomous driving control device 120 executes a lane change to the lane L1 having the highest score, regardless of the default lane (Step S120).

The score correction value in the present example is +0.5. This score correction value is larger than the score difference 0.1 which is given at Step S100 with regard to the default lane. By designing the score correction value to be larger than the score difference due to the default lane, it is possible to make an appropriate lane change considering the driving environment. The score correction value may be gradually increased as closer to the branch lane LB. In this case, it is possible to execute a lane change at an appropriate position while considering the driving environment.

Fifth Example

Figure 19:
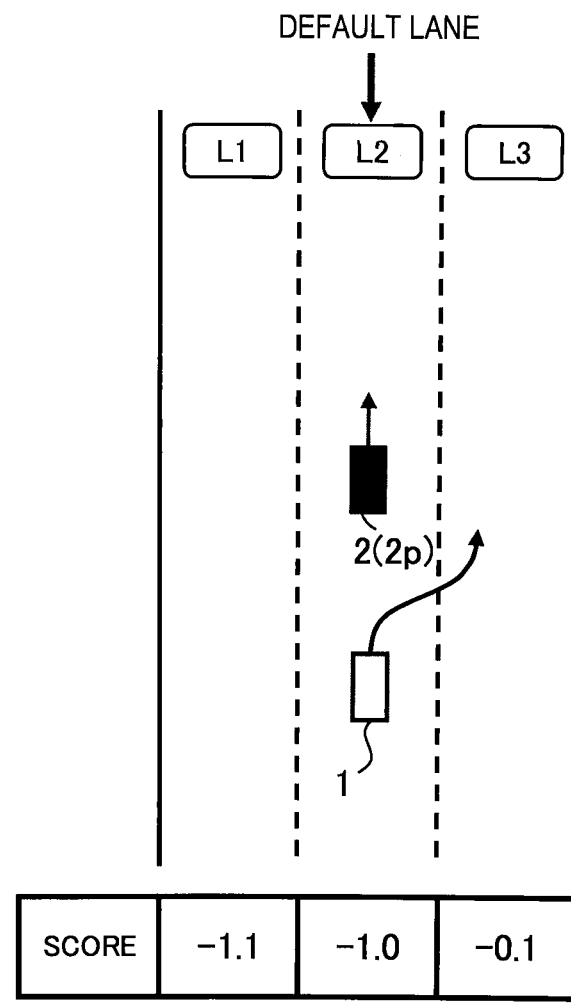
FIG. 19 is a conceptual diagram for explaining a fifth example of the autonomous driving control processing according to the embodiment of the present disclosure.

FIG. 19 is a conceptual diagram for explaining a fifth example of the autonomous driving control processing according to the present embodiment. The fifth example relates to a case where the autonomous driving control device 120 makes a proposal of a lane change to the driver.

At first, the default lane is the lane L2, and the vehicle 1 travels in the lane L2 by the autonomous driving. The score of the lane L2 (the default lane) is 0.0, and the score of each of the other lanes L1 and L3 is −0.1 (see FIG. 14, Step S100).

After that, the autonomous driving control device 120 detects a slow preceding vehicle 2p in front of the vehicle 1 based on the driving environment information 80 (specifically, the sensor detected information 83) (see FIG. 13, Step S50; Yes). The autonomous driving control device 120 gives the driver a proposal to overtake the preceding vehicle 2p (Step S51). The driver approves the proposal (Step S52; Yes). Since the present proposal is related to the overtaking action (Step S60; Yes), the autonomous driving control device 120 maintains the default lane at the lane L2 (Step S55).

In order to perform the overtaking action, the autonomous driving control device 120 corrects the score (see FIG. 14, Step S10). More specifically, the autonomous driving control device 120 decreases the score of the lane L2 in which the preceding vehicle 2p travels, by 1.0. Moreover, the autonomous driving control device 120 decreases the score of the lane L1 on the left side by 1.0, in order to prevent overtaking from the left side. As a result, as shown in FIG. 19, the scores of the lanes L1, L2, and L3 become −1.1, −1.0, and −0.1, respectively. Then, the autonomous driving control device 120 executes a lane change to the lane L3 having the highest score, regardless of the default lane (Step S120).

When the vehicle 1 travels in the lane L3 and overtakes the preceding vehicle 2p, the driving environment changes and the departure reason (i.e. the preceding vehicle 2p ahead) disappears. Accordingly, the autonomous driving control device 120 corrects the score again (see FIG. 14, Step S110). More specifically, the autonomous driving control device 120 resolves the previous score correction to restore the scores. That is, the scores of the lanes L1, L2, and L3 are restored to −0.1, 0.0, and −0.1, respectively. The autonomous driving control device 120 executes a lane change to the lane L2 (the default lane) having the highest score (Step S120). In this manner, the overtaking action is completed.

It should be noted that if the driver rejects the proposal (see FIG. 13, Step S52; No), the autonomous driving control device 120 maintains the default lane at the current lane L2 (Step S54). Furthermore, the autonomous driving control device 120 at least temporarily prohibits the same proposal of overtaking the same preceding vehicle 2p (Step S56). In this case, the autonomous driving control device 120 does not perform the score correction at Step S110. The autonomous driving control device 120 controls the vehicle 1 to keep traveling in the current lane L2 without making a lane change.

What is claimed is:

1. An autonomous driving system mounted on a vehicle, comprising:
an information acquisition device configured to acquire driver operation information indicating an operation by a driver of the vehicle; and
an autonomous driving control device configured to perform autonomous driving control of the vehicle,
wherein the autonomous driving control device performs:
default lane setting processing that sets a default lane in which the vehicle travels; and vehicle travel control processing that controls the vehicle to travel in the default lane when there is no departure reason for departing from the default lane and to travel away from the default lane until there is no departure reason when there is the departure reason, wherein in the default lane setting processing, the autonomous driving control device refers to the driver operation information to set the default lane according to the driver's intention, wherein a lane change instruction or a manual lane change operation by the driver is a lane change intended operation indicating a lane change intention of the driver, and wherein in the default lane setting processing in a process of the autonomous driving control, the autonomous driving control device detects the lane change intended operation based on the driver operation information and sets the default lane according to the lane change intention.

2. The autonomous driving system according to claim 1, wherein when the lane change intended operation is detected, the autonomous driving control device updates the default lane to a target lane intended by the lane change intended operation.

3. The autonomous driving system according to claim 1, wherein a temporary lane change action is a series of actions that makes a lane change from a first lane to a second lane and then returns from the second lane to the first lane again, wherein when the lane change intended operation is detected, the autonomous driving control device performs first determination processing that determines whether or not the lane change intended operation is related to the temporary lane change action, wherein when the lane change intended operation is related to the temporary lane change action, the autonomous driving control device maintains the default lane and performs the vehicle travel control processing to complete the temporary lane change action, and wherein when the lane change intended operation is not related to the temporary lane change action, the autonomous driving control device updates the default lane to a target lane intended by the lane change intended operation.

4. The autonomous driving system according to claim 1, wherein the autonomous driving control device detects an autonomous driving activation instruction by the driver based on the driver operation information, and wherein in response to the autonomous driving activation instruction, the autonomous driving control device activates the autonomous driving control and sets a current lane at a time when the autonomous driving activation instruction is detected, as the default lane.

5. The autonomous driving system according to claim 1, wherein a temporary lane change action is a series of actions that makes a lane change from a first lane to a second lane and then returns from the second lane to the first lane again, wherein the autonomous driving control device detects an autonomous driving activation instruction by the driver based on the driver operation information, wherein in response to the autonomous driving activation instruction, the autonomous driving control device activates the autonomous driving control and performs second determination processing that determines whether or not the vehicle is in a process of the temporary lane change action, wherein when the vehicle is in a process of the temporary lane change action, the autonomous driving control device sets the first lane as the default lane and performs the vehicle travel control processing to complete the temporary lane change action, and wherein when the vehicle is not in a process of the temporary lane change action, the autonomous driving control device sets a current lane at a time when the autonomous driving activation instruction is detected, as the default lane.

6. The autonomous driving system according to claim 1, wherein when there is a lane change reason, the autonomous driving control device makes a proposal of a lane change to the driver, wherein the autonomous driving control device determines, based on the driver operation information, whether the driver approves or rejects the proposal, and wherein when the driver rejects the proposal, the autonomous driving control device sets a current lane as the default lane.

7. The autonomous driving system according to claim 6, wherein when the driver approves the proposal, the autonomous driving control device sets a target lane of the proposed lane change as the default lane.

8. The autonomous driving system according to claim 6, wherein a temporary lane change action is a series of actions that makes a lane change from a first lane to a second lane and then returns from the second lane to the first lane again, wherein when the driver approves the proposal, the autonomous driving control device performs third determination processing that determines whether or not the proposal is related to the temporary lane change action, wherein when the proposal is related to the temporary lane change action, the autonomous driving control device maintains the default lane and performs the vehicle travel control processing to complete the temporary lane change action, and wherein when the proposal is not related to the temporary lane change action, the autonomous driving control device sets a target lane of the proposed lane change as the default lane.

9. An autonomous driving system mounted on a vehicle, comprising:

an information acquisition device configured to acquire driver operation information indicating an operation by a driver of the vehicle; and an autonomous driving control device configured to perform autonomous driving control of the vehicle, wherein the autonomous driving control device performs:

default lane setting processing that sets a default lane in which the vehicle travels; and vehicle travel control processing that controls the vehicle to travel in the default lane when there is no departure reason for departing from the default lane and to travel away from the default lane until there is no departure reason when there is the departure reason, wherein in the default lane setting processing, the autonomous driving control device refers to the driver operation information to set the default lane according to the driver's intention wherein the autonomous driving control device detects an autonomous driving activation instruction by the driver based on the driver operation information, and wherein in response to the autonomous driving activation instruction, the autonomous driving control device activates the autonomous driving control and sets a current lane at a time when the autonomous driving activation instruction is detected, as the default lane.

10. An autonomous driving system mounted on a vehicle, comprising:
- an information acquisition device configured to acquire driver operation information indicating an operation by a driver of the vehicle; and
- an autonomous driving control device configured to perform autonomous driving control of the vehicle,
- wherein the autonomous driving control device performs:
- default lane setting processing that sets a default lane in which the vehicle travels; and
- vehicle travel control processing that controls the vehicle to travel in the default lane when there is no departure reason for departing from the default lane and to travel away from the default lane until there is no departure reason when there is the departure reason,
- wherein in the default lane setting processing, the autonomous driving control device refers to the driver operation information to set the default lane according to the driver's intention,
- wherein when there is a lane change reason, the autonomous driving control device makes a proposal of a lane change to the driver,
- wherein the autonomous driving control device determines, based on the driver operation information, whether the driver approves or rejects the proposal, and
- wherein when the driver rejects the proposal, the autonomous driving control device sets a current lane as the default lane.

11. The autonomous driving system according to claim 10,
- wherein when the driver approves the proposal, the autonomous driving control device sets a target lane of the proposed lane change as the default lane.

12. The autonomous driving system according to claim 10,
- wherein a temporary lane change action is a series of actions that makes a lane change from a first lane to a second lane and then returns from the second lane to the first lane again,
- wherein when the driver approves the proposal, the autonomous driving control device performs third determination processing that determines whether or not the proposal is related to the temporary lane change action,
- wherein when the proposal is related to the temporary lane change action, the autonomous driving control device maintains the default lane and performs the vehicle travel control processing to complete the temporary lane change action, and
- wherein when the proposal is not related to the temporary lane change action, the autonomous driving control device sets a target lane of the proposed lane change as the default lane.

* * * * *